(12) United States Patent
Antonini

(10) Patent No.: US 11,520,134 B2
(45) Date of Patent: Dec. 6, 2022

(54) KIT FOR MICROSCOPIC OBSERVATION ASSOCIABLE WITH AN IMAGE ACQUISITION DEVICE

(71) Applicant: SMARTMICROOPTICS S.R.L., Genoa (IT)

(72) Inventor: Andrea Antonini, Genoa (IT)

(73) Assignee: SMARTMICROOPTICS S.R.L., Genoa (IT)

( * ) Notice: Subject to any disclaimer, the term of this patent is extended or adjusted under 35 U.S.C. 154(b) by 85 days.

(21) Appl. No.: 17/291,549

(22) PCT Filed: Nov. 4, 2019

(86) PCT No.: PCT/IB2019/059440
§ 371 (c)(1),
(2) Date: May 5, 2021

(87) PCT Pub. No.: WO2020/095173
PCT Pub. Date: May 14, 2020

(65) Prior Publication Data
US 2021/0396983 A1 Dec. 23, 2021

(30) Foreign Application Priority Data
Nov. 6, 2018 (IT) .......................... 102018000010053

(51) Int. Cl.
*G02B 21/36* (2006.01)
*G02B 21/02* (2006.01)
(Continued)

(52) U.S. Cl.
CPC ......... *G02B 21/362* (2013.01); *G02B 21/025* (2013.01); *G02B 21/06* (2013.01); *G02B 21/26* (2013.01); *H04M 1/04* (2013.01)

(58) Field of Classification Search
CPC .... G02B 21/362; G02B 21/025; G02B 21/06; G02B 21/26; H04M 1/04
(Continued)

(56) References Cited

U.S. PATENT DOCUMENTS

| 2010/0147710 | A1 | 6/2010 | Lebauer |
| 2011/0009163 | A1* | 1/2011 | Fletcher ................. G02B 21/26 |
| | | | 455/556.1 |

(Continued)

FOREIGN PATENT DOCUMENTS

| CN | 101408669 A | 4/2009 |
| CN | 105629456 A | 6/2016 |

(Continued)

OTHER PUBLICATIONS

International Search Report and Written Opinion for PCT/IB2019/059440, dated Jan. 9, 2020.

*Primary Examiner* — Allen C Wong
(74) *Attorney, Agent, or Firm* — Merchant & Gould P.C.

(57) ABSTRACT

A kit (10) includes a light source (12) and an optical system (14) equipped with a lens assembly (25) defining a magnification optical axis (X-X). A frame (16) is crossable by the light generated by the light source (12). The frame (16) is configured for supporting a sample holder (H), a portable electronic apparatus (S) equipped with an image acquisition device (C), and the optical system (14), which are interposable between the sample holder (H) and the image acquisition device (C). The optical system (14) is configured for being movable in a guided manner on the frame (16), to allow aligning the optical axis (X-X) with the image acquisition device (C). A carrying body (18) is configured for receiving in abutment the frame (16) and housing the light source (12) directing light towards the optical system (14) through the frame (16).

10 Claims, 4 Drawing Sheets

(51) Int. Cl.
*G02B 21/06* (2006.01)
*G02B 21/26* (2006.01)
*H04M 1/04* (2006.01)

(58) Field of Classification Search
USPC .......................................................... 348/79
See application file for complete search history.

(56) References Cited

U.S. PATENT DOCUMENTS

2017/0160534 A1    6/2017  Fan
2018/0180866 A1*   6/2018  Kaminaga ............... H04M 1/21

FOREIGN PATENT DOCUMENTS

CN        206943724 U    1/2018
WO        2015/033817 A1 3/2015

* cited by examiner

KIT FOR MICROSCOPIC OBSERVATION ASSOCIABLE WITH AN IMAGE ACQUISITION DEVICE

This application is a National Stage Application of International Application No. PCT/IB2019/059440, filed Nov. 4, 2019, which claims benefit of Ser. No. 102018000010053, filed Nov. 6, 2018 in Italy and which applications are incorporated herein by reference. To the extent appropriate, a claim of priority is made to each of the above-disclosed applications.

TECHNICAL FIELD

The present invention relates to a kit for microscopic observation associable with an image acquisition device.

BACKGROUND ART

It is known to make microscopic observations through the use of kits or systems associable with image acquisition devices, in particular portable ones, e.g. smartphone cameras or other digital cameras.

In particular, the advantage of using smartphones as elements for collecting microscopic images lies in the exploitation of systems that, as a whole, are more easily transportable than standard microscopes and generally also less expensive, since much of the optics, electronics and software, is included in the smartphone. Thus, an attempt is made to reach a compromise in terms of optical performance, portability and overall cost of the equipment.

Several examples are known in the industry of system structures allowing the use of portable cameras or smartphones as microscopes.

Some of such examples consist of individual lenses suitably applied directly onto the camera; one example is described in patent application publication WO 2017/013553 A1.

Other examples also exist, which propose lens systems equipped with rigid supports making it necessary to position the sample in a predetermined manner relative to the image acquisition device, e.g. at a predefined working distance or on specific phone models, or that require dedicated support structures.

In particular, technical solutions are known which miniaturize and integrate the main elements of microscopes for their association with smartphones. This often implies limitations in terms of universality of use (they can only be adapted to specific phone models), or the use of rather bulky and complex components. As a consequence, such elements have to be carried in suitable cases, since when mounted aboard the phone they prevent the normal use of the device and may suffer damages. On the other hand, simpler systems suffer from performance limitations.

SUMMARY OF THE INVENTION

The present invention relates to a kit for microscopic observation which, in association with an image acquisition device, e.g. the camera of a smartphone, ensures performance levels equaling those of a compact microscope.

It is therefore one object of the present invention to provide a kit capable of overcoming the drawbacks of the prior art; in particular by allowing microscopic observations through a kit which fits different types of image acquisition devices to a substantially universal extent, and which is small in size and ensures great portability while at the same time integrating high-performance optical components and being easy and economical to manufacture.

According to the present invention, this and other objects are achieved through a kit having the technical features set out in the appended independent claim.

A further advantage attainable from the present invention is the possibility of creating a kit made up of a plurality of elements that can be combined in a modular manner. Therefore—unlike integrated systems like those known in the art—such elements can be individually replaced, thereby making the kit easily upgradable.

It is to be understood that the appended claims are an integral part of the technical teachings provided in the following detailed description of the invention. In particular, the appended dependent claims define some preferred embodiments of the present invention, which include some optional technical features.

Further features and advantages of the present invention will become apparent from the following detailed description, which is supplied by way of non-limiting example with particular reference to the annexed drawings, which will be summarized below.

Figure 1:
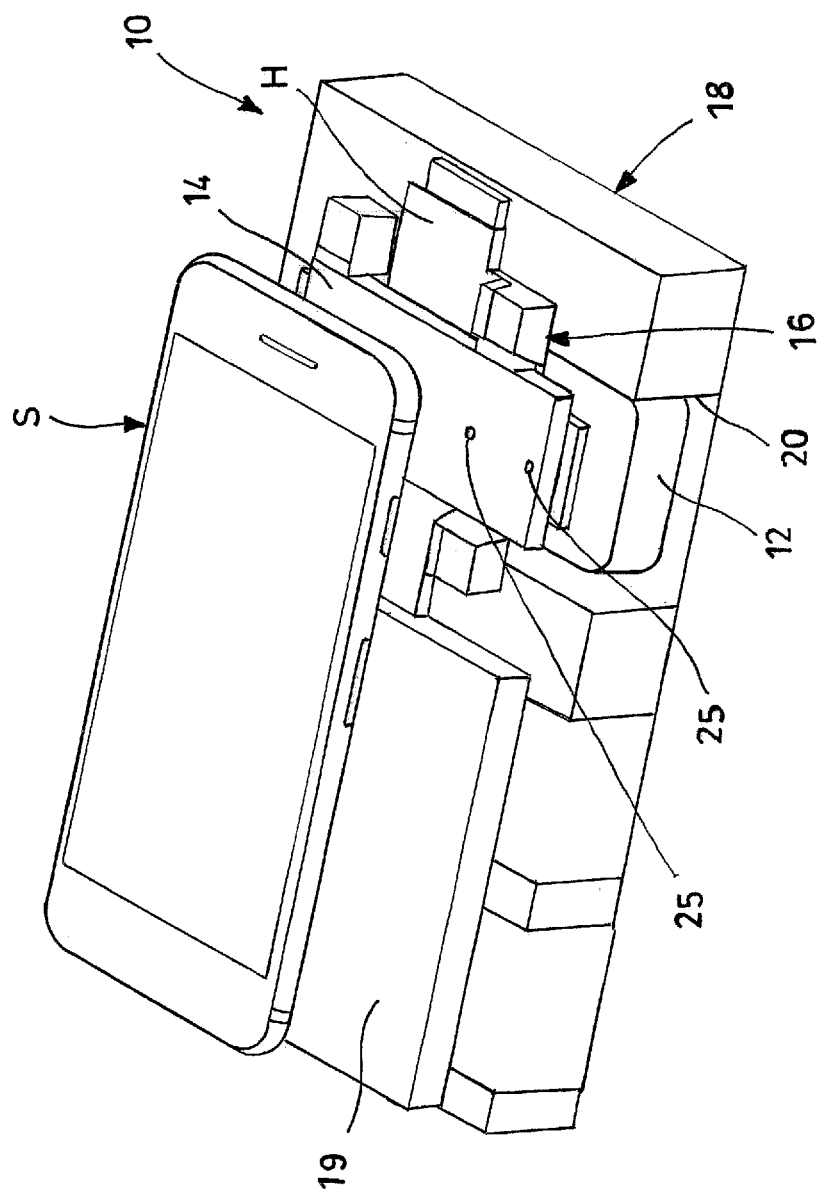
FIGS. 1 and 2 are, respectively, an exploded perspective view and a side elevation view, both of which refer to a mobile phone or smartphone including an image acquisition device, and a kit for microscopic observation associable with the image acquisition device and implemented in accordance with an illustrative embodiment of the present invention.

For completeness' sake, the following is a list of the alphanumerical references used herein to designate parts, elements and components illustrated in the above-described drawings.

C Image acquisition device (Camera)
S Mobile phone (Smartphone)
H Sample holder (Microscope slide)
X-X Optical axis
10 Kit
12 Light source
14 Optical system
16 Frame
18 Carrying body
19 Intermediate bearing structure
20 Seat
22 Supporting part/Plate-like portion
24 Through bore
25 Lens assembly
26 Base
28 Adjusting mechanism
29 Screw element
30 Support portion 32 Optically transparent portion
34 Spacers
36 Covering elements
38 Casing
40 Lateral walls

DETAILED DESCRIPTION OF THE INVENTION

Figure 2:
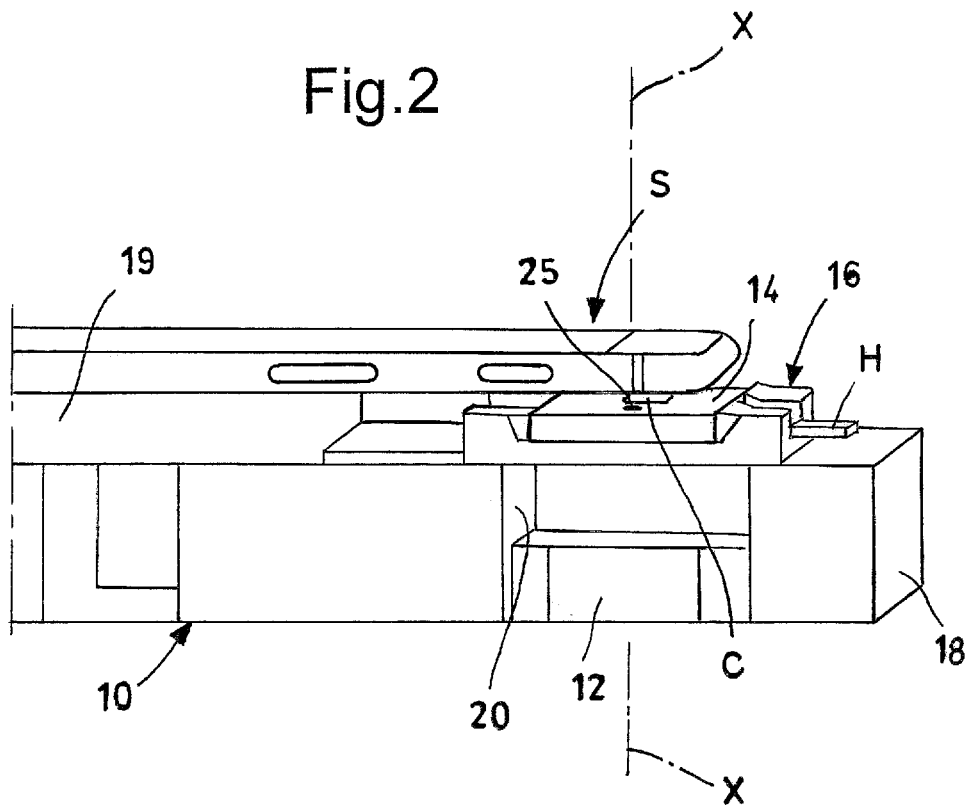

With particular reference to FIGS. 1 and 2, numeral 10 designates as a whole an equipment or kit made in accordance with an illustrative embodiment of the present invention.

Kit 10 can be associated, i.e. used in combination, with an image acquisition device, in particular a camera C. In the drawings shown by way of example, the image acquisition device is carried by a portable electronic apparatus, which may be a mobile phone, in particular a smartphone S. However, kit 10 does not necessarily need to be associated with an image acquisition device C belonging to a mobile phone or smartphone S, since said device may be incorporated into any kind of portable electronic apparatus, e.g. a digital camera, a tablet, or the like.

Still with reference to FIGS. 1 and 2, kit 10 comprises a light source 12 and an optical system 14 carrying at least one lens assembly, each one of them being designated by way of example in the drawings by reference numeral 25.

In the embodiment shown, in particular, in FIGS. 1 and 2, optical system 14 comprises a supporting part, e.g. a plate-like portion 22, which carries the plurality of lens assemblies 25. Of course, the supporting part may also have a different shape or structure, other than that of plate-like portion 22 illustrated by way of non-limiting example.

Each lens assembly 25 comprises one or more magnification lenses and defines an optical axis X-X (e.g. with a focal length ranging from 0.1 mm to 10 mm).

By way of example, in the annexed drawings each lens assembly is designated as 25. As aforementioned, particularly in the embodiments shown in FIGS. 1, 2 and 6, optical system 14 is equipped with a plurality of lens assemblies 25, preferably arranged side by side. Conversely, in the embodiment shown in FIGS. 3 and 5 optical system 14 includes only one lens assembly 25.

Furthermore, kit 10 comprises a frame 16 configured for supporting a sample holder to be observed, such as a microscope slide H. Frame 16 is also configured for supporting the lens system 124 over the sample holder, e.g. microscope slide H. In addition, frame 16 is also configured for supporting the portable electronic apparatus (e.g. the smartphone) that carries the image acquisition device (e.g. camera C) over optical system 14 at optical axis X-X.

Kit 10 further comprises a carrying body 18 configured for receiving in abutment frame 16 and having, by way of example, a parallelepiped shape.

By way of non-limiting example, kit 10 may also include an intermediate bearing structure 19 configured for being interposed between the carrying body and the portable electronic apparatus (e.g. smartphone S) that carries the image acquisition device (e.g. camera C). In the embodiments illustrated by way of example in the drawings, intermediate bearing structure 19 may advantageously have a parallelepiped shape.

Light source 12 may be of several types; for example, it may be a LED emitting white light (or light of another visible colour), ultraviolet light or infrared light. As an alternative, light source 12 may be a laser emitter. Preferably, light source 12 is a LED emitting white light, in particular having such an intensity as to not saturate the sensor of camera C. However, as will be apparent to a person skilled in the art, the intensity and colour of the light emitted by light source 12 may change according to the characteristics of the sample to be examined.

In the illustrated embodiment, carrying body 18 has a seat 20 configured for housing light source 12. Above seat 20, frame 16 is configured for being laid on carrying body 18, so that optical axis X-X will face towards light source 12 situated in seat 20.

According to a variant embodiment (not shown), the light source may be configured for being mounted directly on the frame. In addition or as an alternative, the light source may be integral or made as one piece with the frame. This expedient facilitates the alignment of the light source with the optics of the lens system.

Figure 3:
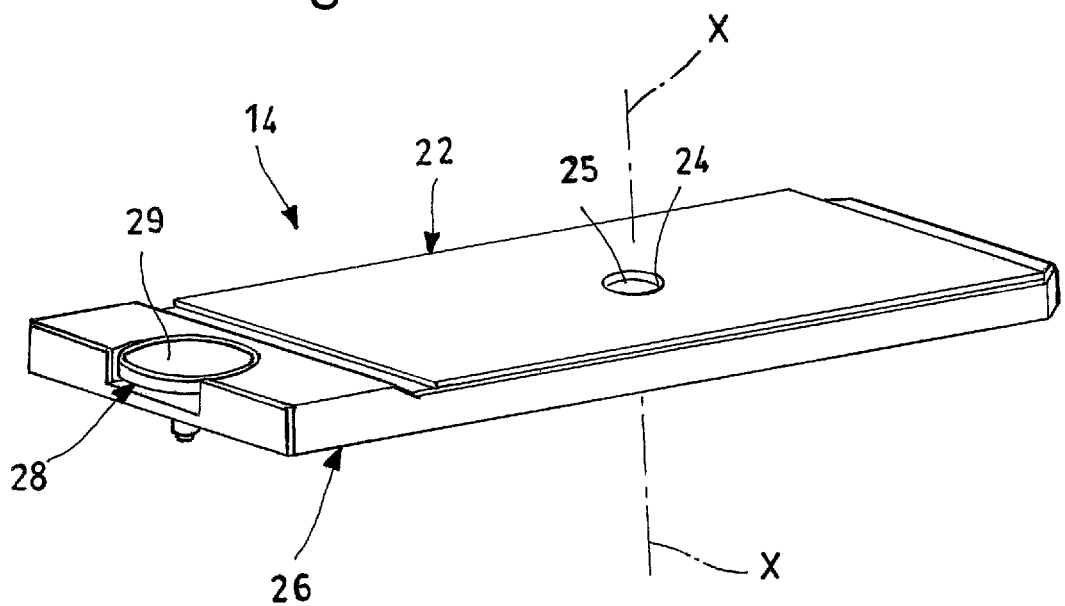
FIG. 3 is a perspective view of an optical system included in a kit for microscopic observation made in accordance with a further illustrative embodiment of the present invention.

In particular, as is visible in FIG. 3, plate-like portion 22 has a generally parallelepiped shape, the extension of which in the direction of optical axis X-X is much shorter than in the other two dimensions.

In the embodiment illustrated in FIG. 3, plate-like portion 22 has a through bore 24 in which lens assembly 25 is inserted, the latter defining optical axis X-X and being associable with image acquisition device C.

In a preferred embodiment, lens assembly 25 inserted in plate-like portion 22 has a planar and watertight surface; this feature makes it possible to use the system in submerged mode to observe liquid samples or samples immersed in a liquid, or to increase the resolution and magnification in solid samples, as commonly done in microscopy.

Figure 6:
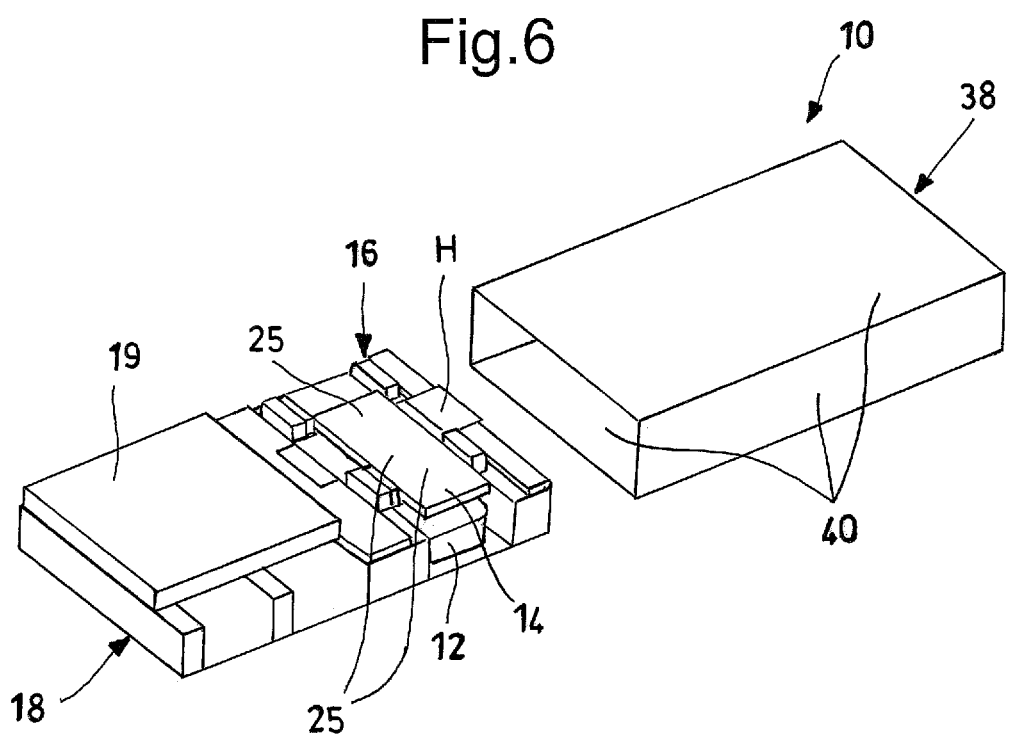
FIG. 6 is an exploded perspective view of a kit for microscopic observation made in accordance with another illustrative embodiment of the present invention, wherein, in particular, a covering element is shown.

As aforementioned, according to the embodiments illustrated in FIGS. 1, 2 and 6, lens system 14 may comprise a plurality of lens assemblies 25, each one defining an optical axis X-X with a different magnification factor than the other lens assemblies. In such variant embodiments, plate-like portion 22 has a plurality of through bores 24, in each one of which the respective lens assembly 25 is inserted. Therefore, lens system 14 can be moved in a guided manner relative to frame 16 without moving sample holder H and the image acquisition device. In this way, it is possible to selectively direct towards the image acquisition device the desired lens assembly 25 for the type of observation to be carried out. Therefore, depending on the position of optical system 14 relative to the image acquisition device (e.g. camera C), it is possible to achieve a different optical magnification effect while observing sample holder H.

Preferably, optical system 14 comprises a base 26 whereon plate-like portion 22 is laid. Optical system 14, in particular including plate-like portion 22 and base 26, can be altogether crossed by the light emitted by light source 12.

In particular and in a further preferred manner, lens assembly 25 can be distributed between plate-like portion and base 26. More in detail, it is advantageously possible to arrange a first lens subassembly (e.g. a first lens) of lens assembly 25 in plate-like portion 22 and, respectively, a second lens subassembly (e.g. a second lens) of lens assembly 25 in base 26. In this way, when laying plate-like portion 22 onto base 26 and aligning the two lens subassemblies with each other, lens assembly 25 can be operatively pre-arranged for using kit 10 with the desired level of magnification. In this regard, in a similarly advantageous manner, it is also possible to conceive a kit 10 including a plurality of interchangeable plate-like portions, each one provided with a respective first lens subassembly with a different magnification effect in comparison with the other plate-like portions. Thus, such plate-like portions can be superimposed on the same base so as to form a plurality of optical structures (each one being defined by a respective combination of plate-like portion and base) defining as a whole different magnification levels.

As will be apparent to a person skilled in the art, in further less advantageous variant embodiments not illustrated herein, the lens assembly may be entirely carried by the supporting part—consisting, in particular, of the plate-like portion—or by the base.

More preferably, base 26 is equipped with an adjusting mechanism 28 configured for adjusting the distance of base 26 from frame 16, and hence from a sample holder H and/or from the image acquisition device, which are intended to be laid onto frame 16. This permits adjusting the distance of optical system 14 (in particular, comprising plate-like portion 22 and/or base 26) and of the associated lens assembly (ies) 25 from sample holder H and/or the image acquisition device.

With reference to the example illustrated in FIG. 3, adjusting mechanism 28 comprises a screw element 29 passing through base 26, the distal end of which is configured for abutting against frame 16. In particular, the rotation of the wide head of screw element 29 allows adjusting the portion of the distal end protruding from base 26, and hence the distance between base 26 and frame 16.

Advantageously but not necessarily, optical system 14 is slidably movable sideways relative to frame 16, so that it can protrude laterally with respect to portable electronic apparatus S with which image acquisition device C is associated, particularly when the latter is facing towards or aligned with optical axis X-X. In this way, it is possible to arrange adjusting mechanism 28 in a lateral position of base 26 (e.g. at an end portion of base 26), thus allowing easy access to such mechanism without the need for removing the portable electronic apparatus with which the image acquisition device is associated in the optically aligned condition. In particular, adjusting mechanism 28 is located in a position laterally spaced apart from optical axis X-X, which permits a finer rise adjustment.

Figure 4:
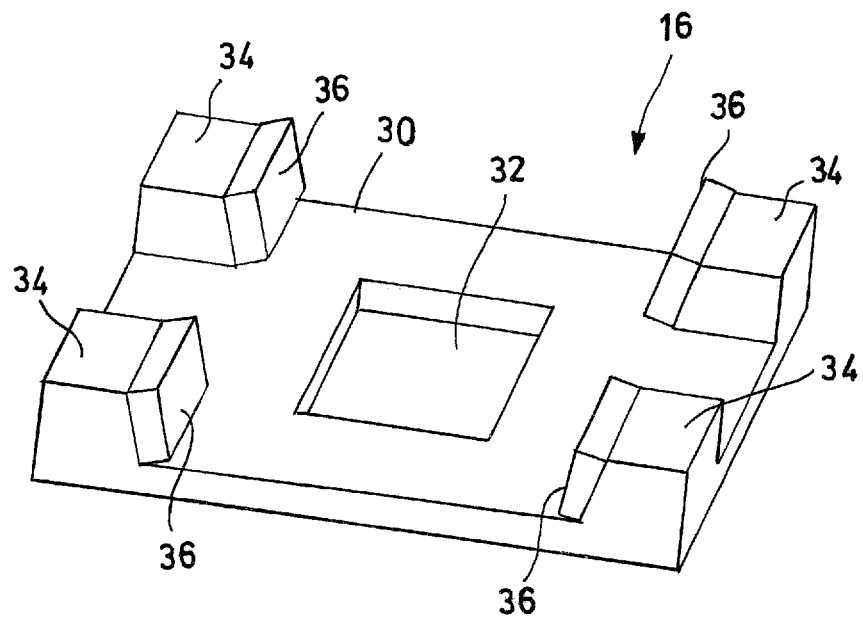
FIG. 4 is a perspective view of a supporting element included in the kits shown in the preceding figures.
Figure 5:
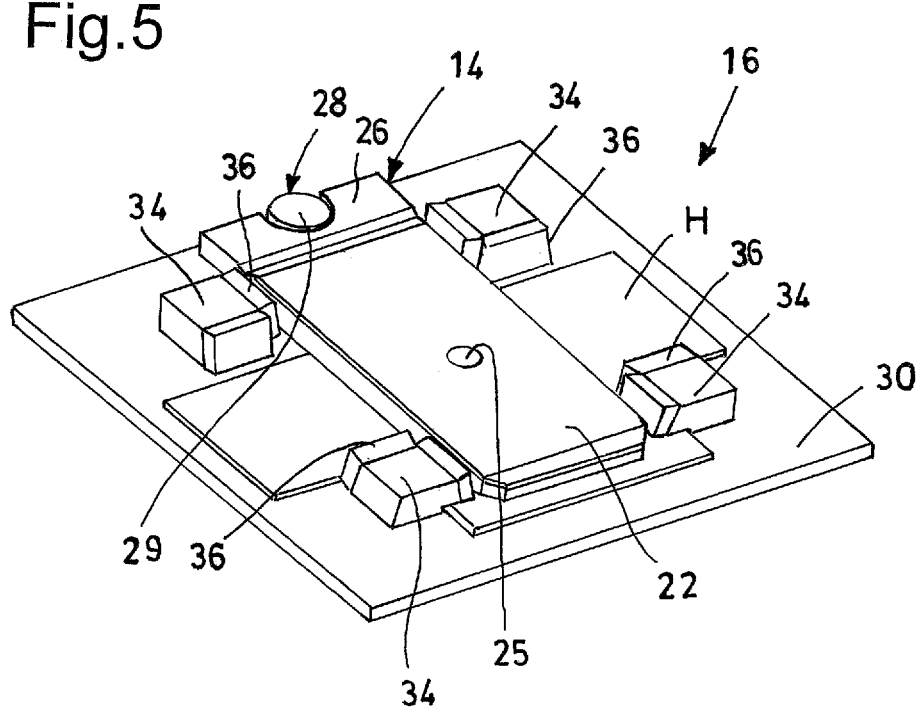
FIG. 5 is a perspective view of the supporting element visible in FIG. 4, which supports a microscope slide and the optical system visible in FIG. 3.

In the illustrated embodiment, particularly with reference to FIGS. 4 and 5, frame 16 has a support portion 30 configured for receiving in abutment sample holder H and for being in turn laid onto carrying body 18. In particular, base 26 of optical system 14 is laid on support portion 30; in such a case, by way of non-limiting example, adjusting mechanism 28 is configured for co-operating with support portion 30, e.g. with the distal end of screw element 29 resting on support portion 30.

For example, the plan section of support portion 30 may have any geometry, in particular rectangular, square or circular. The circular version allows for easy rotation of sample holder H and/or optical system 14 relative to light source 12, which is a particularly advantageous aspect that permits changing the polarization of the collected light for applications with polarizing filters in the optical path.

In further variant embodiments (not shown), the support portion may have, at its periphery, one or more holes adapted to be crossed by one or more respective screws whereon the sample holder is intended to rest. It will thus be possible to adjust the distance between the sample holder and the support portion.

Preferably, support portion 30 is at least partly transparent (in particular, optically non-scattering) or perforated, so as to ensure visibility through the entire optical axis X-X, i.e. with no interruptions in the optical path starting from the image acquisition device and extending through optical system 14, sample holder H, frame (on which the sample holder H rests) and carrying body 18 to finally reach light source 12.

In the illustrated embodiment, support portion 30 has an optically transparent portion 32 situated in a substantially central position. Optical axis X-X is configured for facing towards optically transparent portion 32 when optical system 14 is laid onto the sample holder H resting on frame 16; at the same time, light source 12 is configured for facing towards optically transparent portion 32 when the frame is laid onto carrying body 18.

For example, optically transparent portion 32 may be a through aperture or window formed through support portion 30.

As an alternative to the through aperture or window, optically transparent portion 32 may be a part of support portion 30 made of transparent material and configured to allow the passage of the light coming from light source 12 and going through sample holder H.

According to a particular variant of the present invention, in the case that optically transparent portion 32 is provided as a part of transparent material, it may be formed as a recess or cavity in support portion 30. Such recess or cavity may advantageously, but not necessarily, be suitable for internally receiving a quantity of liquid. For example, according to yet another alternative variant embodiment, such basin may be closed at the top with a transparent film or a cover slip.

According to a further embodiment of the present invention, in the case that optically transparent portion 32 is provided as a part of transparent material, it may internally include an additional lens assembly co-operating with the lens assembly carried by plate-like portion 22. This makes it possible to envisage further optical effects detectable by means of kit 10.

In the illustrated embodiment, frame 16 also comprises retaining means associated with support portion 30 and configured for laterally limiting the movement of optical system 14. In particular, the retaining means preferably comprise a plurality of spacers 34 protruding from support portion 30, between which optical system 14 is configured to extend. By way of example, spacers 34 are substantially shaped like a square peg.

Preferably, the space comprised between the retaining means, in particular spacers 34, defines a housing performing the function of delimiting the lateral movement of optical system 14, in particular of plate-like portion 22 and/or base 26 of the latter.

In the illustrated embodiment, the distance between spacers 34 is longer than the width of a sample holder H. It is thus possible to carry out scans of the sample by moving sample holder H, without however moving the support and optical system 14. In particular, the distance between spacers 34 is such that sample holders can be housed between them which have standard dimensions for microscopy applications. In a preferred configuration, such distance exceeds the width of sample holder H by approximately 10-50%. In a further preferred manner, spacers 34 may also be removable from support portion 30 and then assemblable at different predetermined distances; in this way it is possible to accommodate a sample holder H having a lateral extension exceeding that of standard sample holders or slides for microscopy applications.

In the illustrated embodiment, and in light of the above, sample holder H and optical system 14 can be positioned in such a way that their respective major extensions (lengths) are either parallel or perpendicular.

In particular, spacers 34 are configured for exerting pressure on optical system 14 (particularly on base 26 configured for supporting plate-like portion 22), so as to retain it in the desired position on frame 16. In the illustrated embodiment, each one of spacers 34 is provided with a corresponding covering element 36 made of elastic material (e.g. having a Young modulus in the range of 0.01 GPa to 0.1 GPa). Preferably, covering elements 36 are tilted to facilitate the insertion of optical system 14 (in particular, of base 26 adapted to support plate-like portion 22) into the housing defined by the space between spacers 34.

For example, covering elements 36 may be made of a material selected from the group including foam polyurethane (polyether and polyester), foam rubber (preferably with closed or semi-closed cells), sponge rubber, neoprene, EPDM, silicone foam, expanded EVA and reticulated or expanded polyethylene.

Similarly to the above discussion concerning sample holder H, the distance between spacers 34 equipped with the covering elements 36 is shorter than the width of the optical system 14 (in particular, of plate-like portion 22 and/or base 26).

The use of spacers 34 avoids the use of fastening elements, such as screw clamps or spring-type systems, which would protrude in directions perpendicular to optical system 14 (in particular, to plate-like portion 22 and/or base 26); these area are thus advantageously left clear to avoid any mechanical interference with the image acquisition device, and also because such elements would make the device difficult to use because of the small room available for manual interventions.

Carrying body 18 has such a lateral extension and a height as to ensure proper support in the correct position for electronic apparatus S incorporating image acquisition device C and for frame 16, sample holder H and optical system 14. In particular, carrying body 18 is made of a material capable of withstanding the weight of the above-mentioned elements without undergoing any deformation.

Advantageously, carrying body 18 performs the function of containing the remaining elements of kit 10, when it is not in use. In particular, carrying body 18 has a plurality of housings structured for containing the light source, optical system 14 and frame 16 inside of them.

Preferably, the housings of carrying body 18 are defined by cavities and/or surfaces on different levels, configured for housing the remaining elements of kit 10. Moreover, carrying body 18 may also include cavities for housing one or more sample holders H. Thus, carrying body for microscopy elements will substantially act as a casing adapted for transportation of the same elements.

Preferably, kit 10 includes a casing or box 38 configured for internally receiving, e.g. via a sliding action, carrying body 18 and the remaining elements and components of said kit. In the illustrated embodiment, casing 38 has a substantially box-like shape complementary to that of carrying body 18. In particular, said box-like shape of casing 38 is formed by a hollow structure that defines a plurality of lateral housing walls, wherein the opposite bases are open to allow the insertion of carrying body 18 via a sliding action.

Of course, without prejudice to the principle of the invention, the forms of embodiment and the implementation details may be extensively varied from those described and illustrated herein by way of non-limiting example, without however departing from the scope of the invention as set out in the appended claims.

For example, as aforementioned, the above-described supporting part may also have a different shape or structure, other than the plate-like portion illustrated herein merely by way of non-limiting example.

Furthermore, in alternative embodiments not shown herein the optical system may consist of the base carrying the entire lens assembly, without the presence of a corresponding supporting part—in particular, the plate-like portion—to be laid onto the base, and without the lens assembly being divided into subassemblies.

The invention claimed is:

1. A kit for microscopic observation associable with an image acquisition device; said kit comprising:
    a light source;
    an optical system equipped with at least one magnification lens assembly defining an optical axis; and
    a frame crossable by the light generated by said light source and configured for supporting:
        a sample holder,
        a portable electronic apparatus equipped with said image acquisition device, and
    said optical system being interposable between said sample holder and said image acquisition device; said optical system being configured for being movable in a guided manner on said frame, to allow aligning said optical axis with said image acquisition device; and
    a carrying body configured for receiving in abutment said frame and housing said light source directing light towards said optical system through said frame.

2. The kit according to claim 1, wherein said optical system comprises a base crossable by the light generated by said light source, said base being configured to be laid on said frame, and said base is equipped with an adjusting mechanism configured for adjusting an axial distance of the lens assembly from the frame.

3. The kit according to claim 2, wherein said adjusting mechanism is located in a laterally spaced position relative to said lens assembly.

4. The kit according to claim 3, wherein said adjusting mechanism comprises a screw element passing through said base, the distal end of said screw is configured for abutting against said frame.

5. The kit according to claim 2, wherein said optical system comprises a supporting part carrying said at least one lens assembly and is configured to be laid on said base.

6. The kit according to claim 1, wherein said frame comprises a support portion crossable by the light generated by said light source, and a retainer associated with said support portion and configured for laterally limiting movement of said optical system.

7. The kit according to claim 6, wherein said retainer comprises a plurality of spacers protruding from said support portion.

8. The kit according to claim 6, wherein said retainer is configured for exerting pressure on the optical system to retain the optical system laterally on said frame.

9. The kit according to claim 1, wherein said carrying body has a plurality of housings structured for containing said light source, said optical system and said frame inside of the housings, even when said kit is not in use.

10. The kit according to claim 9, further comprising a casing configured for receiving said carrying body, wherein said light source, said optical system and said frame are contained in said plurality of housings, when said kit is not in use.

* * * * *

UNITED STATES PATENT AND TRADEMARK OFFICE
CERTIFICATE OF CORRECTION

| | |
|---|---|
| PATENT NO. | : 11,520,134 B2 |
| APPLICATION NO. | : 17/291549 |
| DATED | : December 6, 2022 |
| INVENTOR(S) | : Andrea Antonini |

It is certified that error appears in the above-identified patent and that said Letters Patent is hereby corrected as shown below:

On the Title Page

Item (71) Applicant: SMARTMICROOPTICS S.R.L., "Genoa (IT)" Should read --Genova (IT)--

Item (72) Inventor: Andrea Antonini, "Genoa (IT)" Should read --Genova (IT)--

Item (73) Assignee: SMARTMICROOPTICS S.R.L., "Genoa (IT)" Should read --Genova (IT)--

Signed and Sealed this
Twenty-first Day of March, 2023

Katherine Kelly Vidal
*Director of the United States Patent and Trademark Office*